United States Patent [19]

Hilles et al.

[11] Patent Number: 5,111,394
[45] Date of Patent: May 5, 1992

[54] CIRCUIT AND METHOD FOR ENERGIZING A SOLENOID IN AN ELECTRONIC DEVICE FOR A PREDETERMINED ENERGIZING PERIOD

[75] Inventors: Wilbur I. Hilles, New Concord, Ohio; David A. Rieker, Lawrenceville, Ga.

[73] Assignee: NCR Corporation, Dayton, Ohio

[21] Appl. No.: 411,273

[22] Filed: Sep. 22, 1989

[51] Int. Cl.$^5$ .................... G06F 15/20; E05B 64/5C
[52] U.S. Cl. .................... 364/405; 235/22; 109/39
[58] Field of Search .................... 364/405; 235/22; 312/333; 109/38–39, 43

[56] References Cited

U.S. PATENT DOCUMENTS

| | | | |
|---|---|---|---|
| 3,855,432 | 12/1974 | Kelly et al. | 200/61.61 |
| 4,101,745 | 7/1978 | Smith | 200/61.61 |
| 4,399,508 | 8/1983 | Nakatani et al. | 364/405 |
| 4,424,426 | 1/1984 | Ishii | 200/61.61 |
| 4,485,337 | 11/1984 | Sandusky | 318/314 |
| 4,523,134 | 6/1985 | Kinoshita et al. | 318/313 |
| 4,595,985 | 6/1986 | Sakakiya | 364/405 |
| 4,626,844 | 12/1986 | Mann et al. | 340/825.31 |
| 4,630,200 | 12/1986 | Ohmae et al. | 235/379 |
| 4,680,707 | 7/1987 | Iida | 364/405 |
| 4,720,611 | 1/1988 | Ishii | 200/61.61 |
| 4,803,346 | 2/1989 | Lyons et al. | 312/333 |
| 4,811,579 | 3/1989 | Lyons et al. | 312/333 |
| 4,829,429 | 3/1989 | Komai et al. | 364/405 |
| 4,873,850 | 10/1989 | Lyons et al. | 312/333 |

*Primary Examiner*—Gail O. Hayes
*Attorney, Agent, or Firm*—Wilbert Hawk, Jr.; Albert L. Sessler, Jr.; Matthew R. Jenkins

[57] ABSTRACT

An electronic business machine having a cash drawer therein, the electronic business machine including a circuit which operatively couples the microprocessor to a driver which energizes a device, such as a solenoid, for a predetermined period of time, which can be altered by programming, in order to open the cash drawer. An alternative embodiment discloses a multivibrator being used in place of the circuit for energizing the driver.

19 Claims, 13 Drawing Sheets

CIRCUIT AND METHOD FOR ENERGIZING A SOLENOID IN AN ELECTRONIC DEVICE FOR A PREDETERMINED ENERGIZING PERIOD

BACKGROUND OF THE INVENTION

1. Field of the Invention

This invention relates to a circuit and method for energizing a solenoid for a predetermined energizing period, and more particularly, it relates to a circuit and method for energizing a solenoid in a point of sale terminal having a solenoid-operated cash drawer for a predetermined energizing period.

2. Description of Related Art

In recent years, the use of software to control the operation of electronic business machines, such as Point of Sale (POS) terminals, has become widespread. For example, the software can be used to generate an energizing signal which will energize a solenoid to open a cash drawer. Typically, the solenoid will remain energized until the software terminates the energizing signal. A fault or malfunction in the software may cause the software to fail to terminate the energizing signal, thereby causing the solenoid to remain energized. The solenoid may become damaged if the solenoid is energized for a period that exceeds its duty cycle. A user may have to spend a considerable amount of time and expense to repair the solenoid and the cash drawer before the POS terminal can function properly again.

SUMMARY OF THE INVENTION

This invention overcomes the problems in the prior art by providing a circuit and method for energizing a solenoid in a solenoid-operated cash drawer for a predetermined energizing period. The invention allows software to initiate the opening of the cash drawer and then causes hardware to control the time duration of the energizing signal which energizes the solenoid to open the cash drawer.

In one aspect of the invention, this invention includes an electronic business machine a cash drawer therein, said electronic business machine comprising: a master controller including software for controlling the operation of the electronic business machine; a keyboard coupled to said master controller, said keyboard having at least one key thereon; first means controlled by said master controller for generating a first signal in response to said at least one key being actuated; opening means for opening he cash drawer; and a timeout circuit operatively coupling said fist means and said opening means; said timeout circuit being capable of generating a second signal in response to said first signal; said software in said master controller initiating said first means to generate said first signal and said timeout circuit generating the second signal for a predetermine energizing period in response to said first signal when said at least one key is actuated, said opening means becoming energized for said predetermined energizing period and causing the cash drawer to open in response to said second signal.

Another aspect of this invention is that it includes a method for energizing a device in a point of sale terminal for a predetermined energizing period, the device being capable of opening a cash drawer in the terminal when the device is energized, the point of sale terminal further having a master controller and a circuit controller for generating a first signal and a second signal, respectively, the method comprising the steps of: (I) generating a first signal with the master controller; (II) generating a second signal with the circuit controller in response to the first signal; (III) controlling the duration of the second signal; (IV) using the second signal to energize the device for the predetermined energizing period; and (V) using the device to open the cash drawer; step (III) further including the steps of: (III)(a) providing a master clock signal; (III)(b) generating a cumulative count of pulses of the master clock signal in response to the first signal; (III)(c) comparing the cumulative count to a predetermined count corresponding to the duration of the predetermined energizing period; and (III)(d) terminating the second signal generated in the step (II) when the cumulative count and the predetermined count are equal.

An object of this invention is to provide a circuit for energizing a solenoid for a predetermined energizing period.

Another object of this invention is to provide a means for prolonging the life of an electronic device, such as a solenoid.

Another object of this invention is to energize a solenoid for opening a cash drawer in an electronic device by initiating the energizing sequence with software, but controlling the time duration of the energizing sequence with hardware.

Another object of this invention is to provide a device which has an energizing period which is programmable.

Another object of this invention is to provide a means for ensuring that a device, such as a solenoid, will not be energized beyond its duty cycle.

Another object of this invention is to provide an inexpensive method for energizing a device in a point of sale terminal for a programmable predetermined energizing period.

These objects, and others, may be more readily understood in connection with the following specification, claims, and drawing.

BRIEF DESCRIPTION OF THE DRAWING

FIG. 1, is a general block diagram of the microprocessor and associated circuitry used in this invention;

FIG. 6 is a diagram showing the manner in which FIGS. 5A-5F are arranged to form the timeout circuit;

DESCRIPTION OF THE PREFERRED EMBODIMENT

Figure 1:
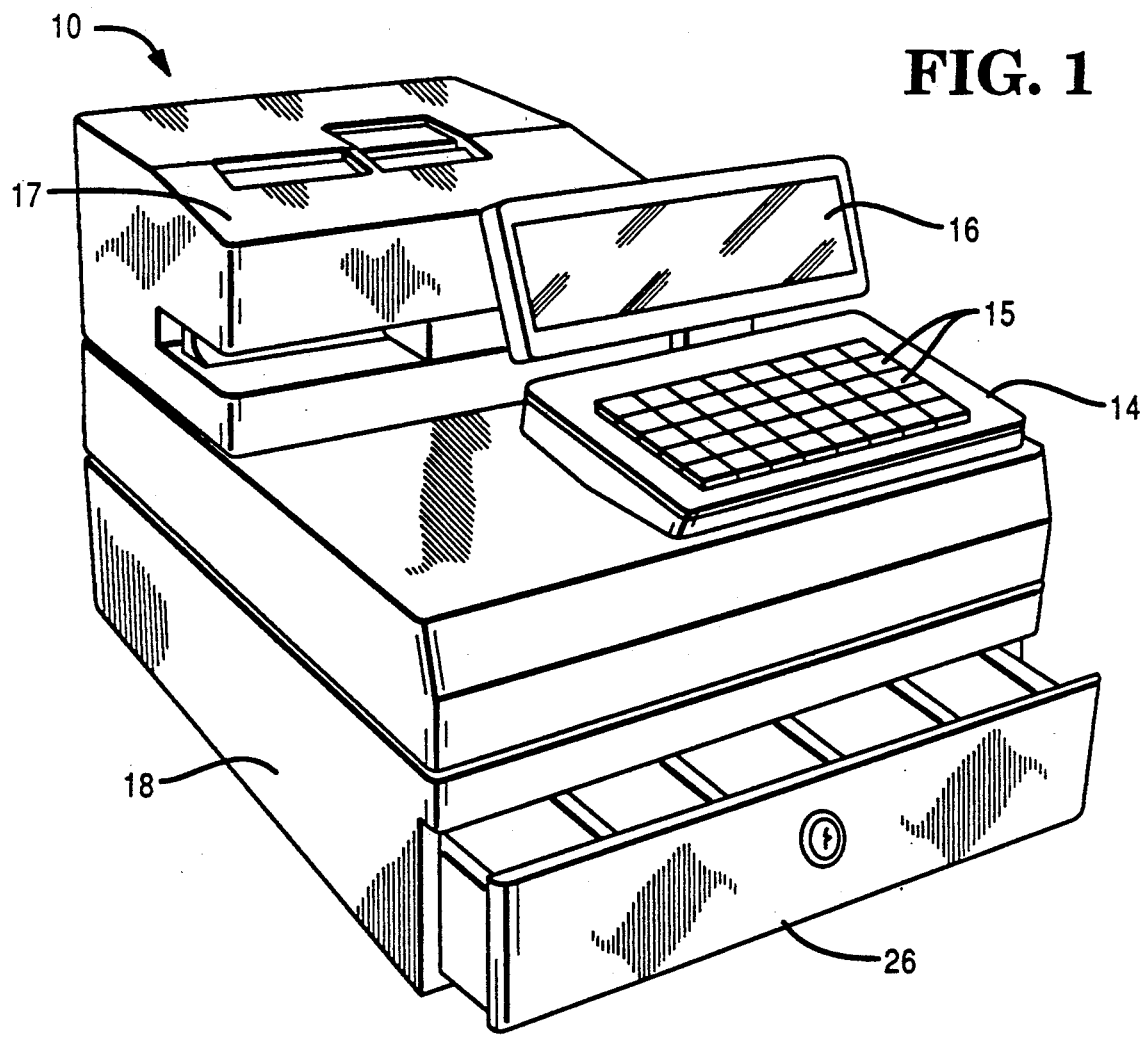
FIG. 1 is a perspective view, showing a terminal, a base including a cash drawer, a keyboard, a printer, and a display.

FIG. 1 shows a perspective view of a typical POS terminal or cash register, hereinafter designated generally by the numeral 10, in which the apparatus of this invention might be used. The terminal 10 includes a keyboard 14, a display 16, a printer 17, and a base member 18 in which a cash drawer 26 is slidably mounted. The keyboard 14 includes a plurality of keys 15 which can be used to operate terminal 10. The operation of a control key 15 on keyboard 14 at the conclusion of a sales transaction, for example, will result in the opening of cash drawer 26.

Figure 2A:
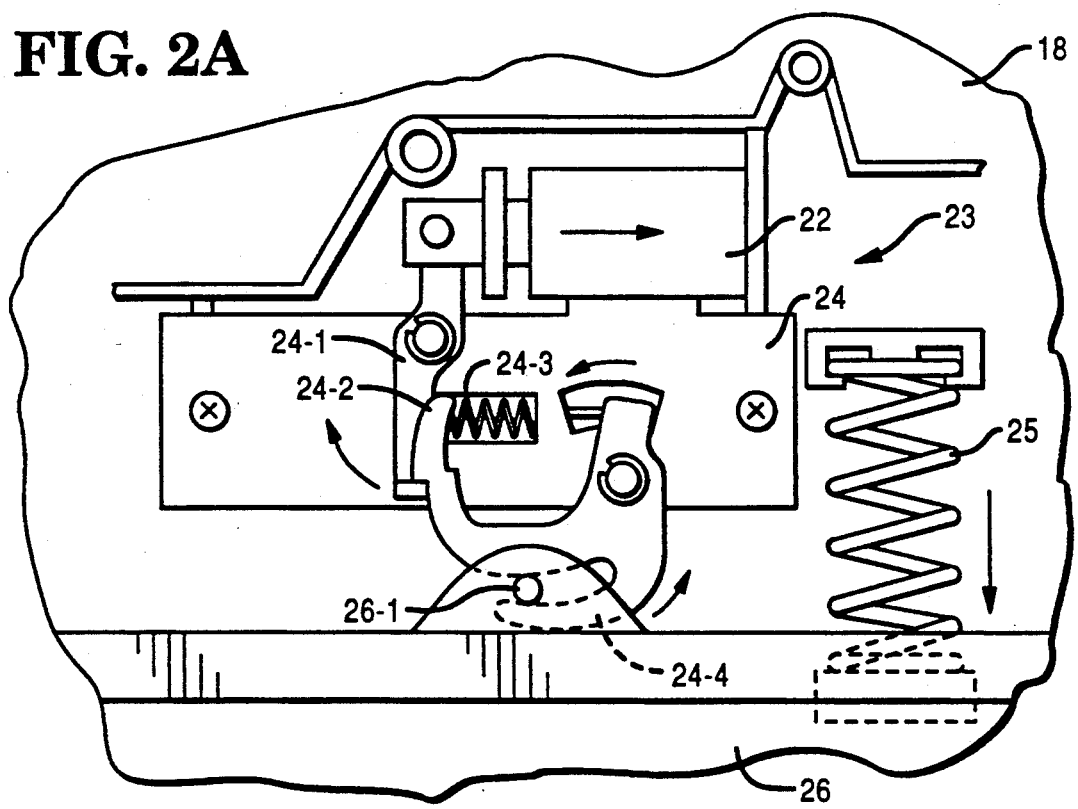
FIGS. 2A and 2B are fragmentary top views, showing a cash drawer in locked and released position, respectively, within the base.
Figure 2B:
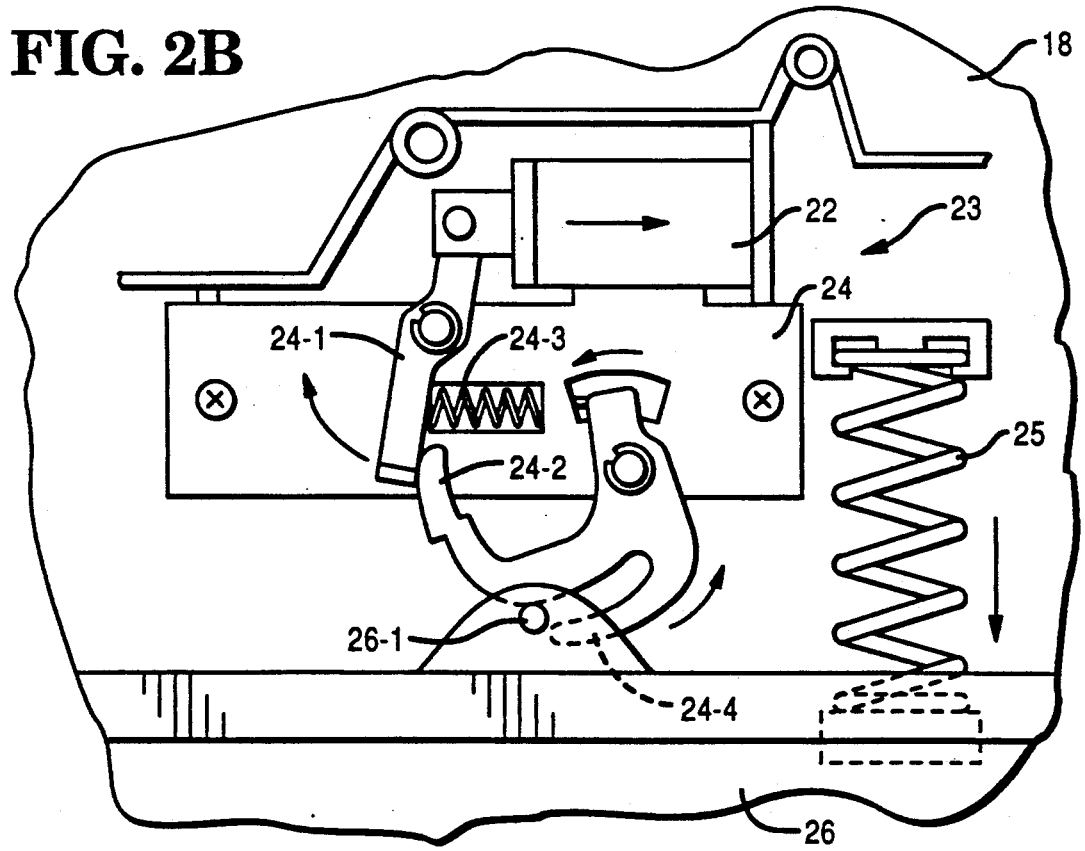

Referring now to FIG. 2A, there is shown a fragmentary top view of cash drawer 26 located in a closed and locked position within base member 18. A means, generally indicated by the numeral 23, for opening the cash drawer 26 is located in the base member 18. The opening means 23 includes a release mechanism 24. Any conventional release mechanism may be used, such as, for example, the release mechanism disclosed in U.S. Pat. No. 4,811,579, which is assigned to the assignee of the present application. The opening means 23 includes a device, like solenoid 22, which will be energized at the conclusion of a sales transaction by the operation of an appropriate key 15 on keyboard 14 (FIG. 1). Actuation of solenoid 22 (FIG. 2B) results in the clockwise movement of the blocking member 24-1, thereby releasing first latch member 24-2 for a counterclockwise movement under the action of spring 24-3. This counterclockwise movement of first latch member 24-2 releases pin 26-1 of cash drawer 26 from engagement with second latch member 24-4 allowing spring member 25 to move cash drawer 26 to an open position, as best shown in FIG. 2B.

Figure 3:
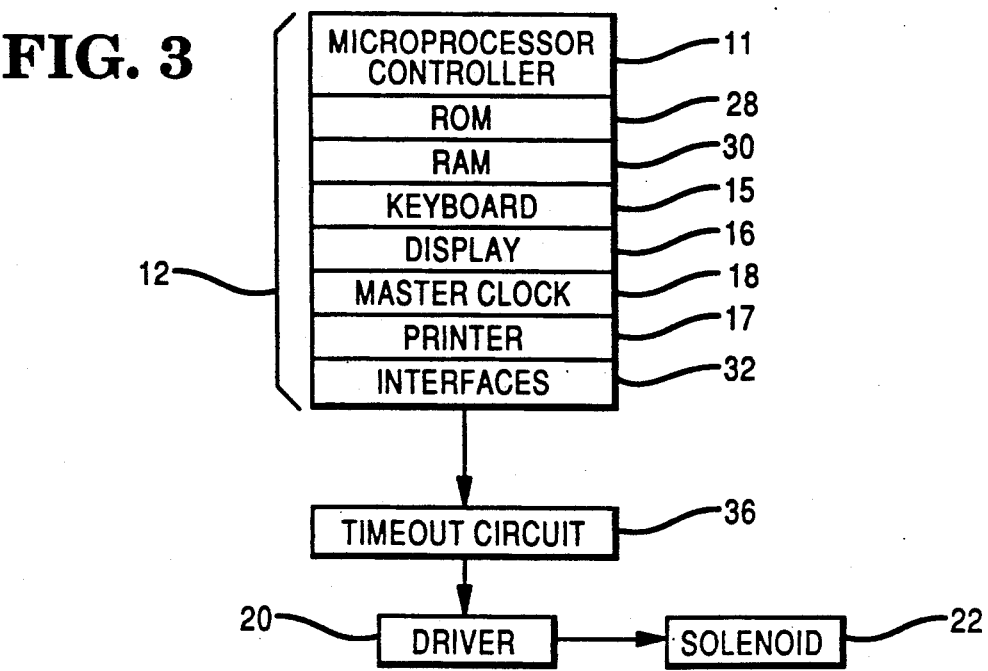
FIG. 3, which is shown on the sheet containing

FIG. 3 shows a block representation of microprocessor 12 which resides inside terminal 10 (FIG. 1) and which energizes driver 20 to drive solenoid 22. The microprocessor 12 includes a microprocessor controller 11 which has software which is used to control terminal 10 and the various components thereof. The terminal 10 includes a means for generating input signals in response to one of the keys 15 on keyboard 14 being actuated. In a preferred embodiment, IOD17, IOWN, and PT41 input signals (FIG. 7A) are generated by a read-only memory (ROM) 28 in microprocessor 12 in response to one or more keys 15 on keyboard 14 being actuated. It is to be noted that the necessary instructions for operating terminal 10 may also be stored in the ROM 28 or a random access memory (RAM) 30. A plurality of interfaces 32 are used to provide communications between the microprocessor 12 and the various components, such as display 16 (FIG. 1). The interfaces 32 may also be used to connect microprocessor 12 to a host computer (not shown). The microprocessor 12 includes a master clock 18 which provides a master clock signal for synchronizing the operation of terminal 10. A timeout circuit 36 couples the microprocessor 12 to a driver 20. As will be described hereinafter, the function of the timeout circuit 36 is to provide an energizing signal to energize driver 20, which energizes solenoid 22, for a predetermined energizing period in response to the appropriate key 15 on keyboard 14 being actuated. The energizing signal is received by the driver 20 which energizes solenoid 22 of the opening means 23, thereby causing second latch member 24-4 to release pin 26-1 which causes the cash drawer 26 to open under the action of spring 25. In the preferred embodiment, the microprocessor 12, timeout circuit 36 and driver are located on the same circuit board (not shown).

Figure 4:
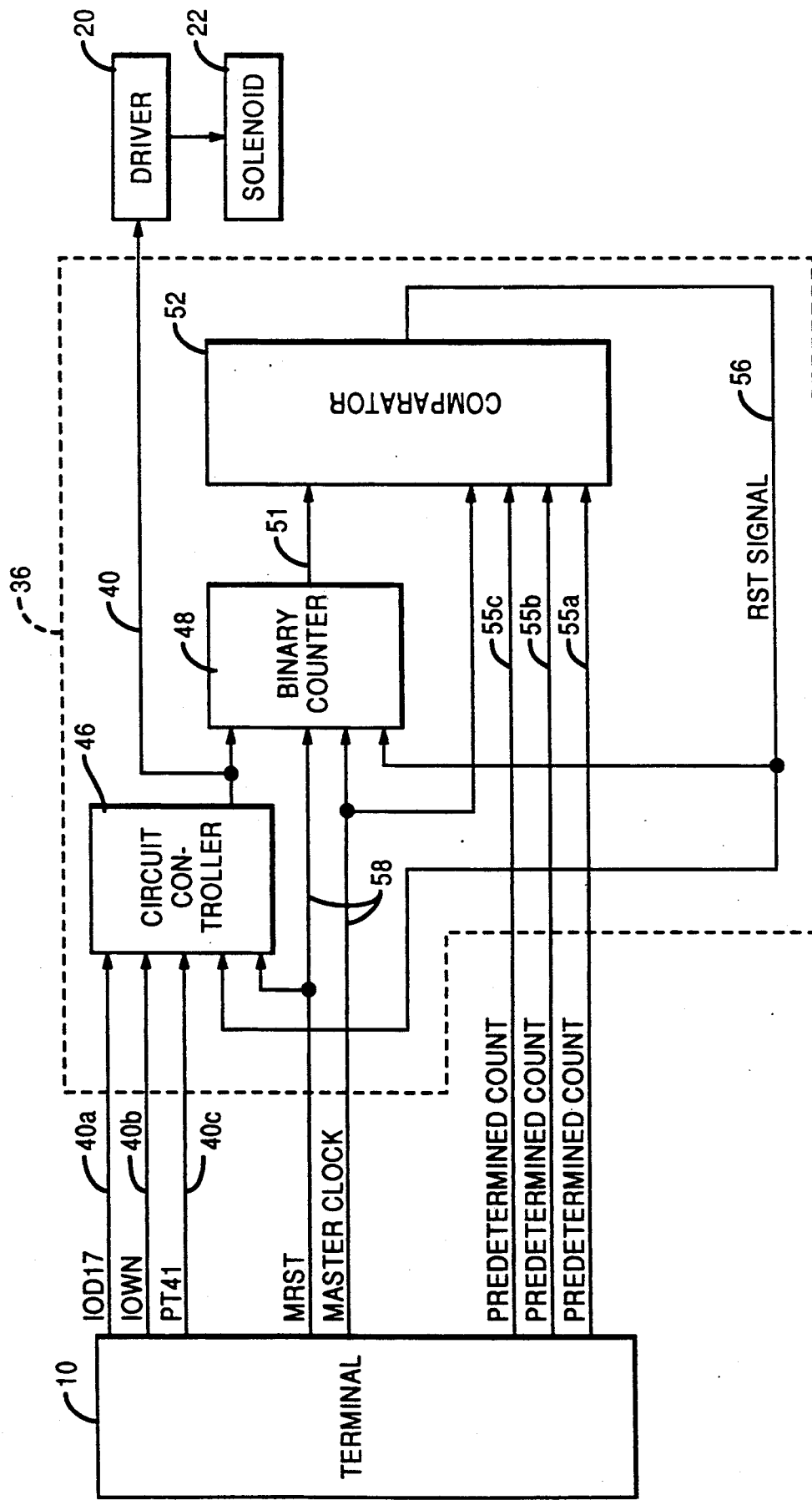
FIG. 4 is a general schematic diagram, showing a timeout circuit used in a preferred embodiment of this invention.

As best shown in FIG. 4, the timeout circuit 36 is comprised of a circuit controller 46, binary counter 48, and a comparator 52. The circuit controller 46 receives the IOD17, IOWN, and PT41 signals and generates an energizing signal in response thereto. It is to be noted that the circuit controller 46 generates an energizing signal on line 40 which energizes driver 20 for the predetermined energizing period beginning when circuit controller 46 receives the IOD17, IOWN, and PT41 signals from terminal 10 and continuing until circuit controller 46 receives a RST signal on line 56 from comparator 52, as will be described later herein. The timeout circuit 36 also includes a seventeen bit binary counter 48 for generating a binary count on line 51. The binary count represents the cumulative count of pulses of the master clock signal generated by the binary counter 48 during the predetermined energizing period. The timeout circuit 36 also includes a comparator 52 which is operate very coupled to circuit controller 46 and to binary counter 48 by line 56. As will be described later herein, comparator 52 receives a binary count and also receives a programmable predetermined count from ROM 28 in terminal 10 on lines 55a, 55b, and 55c, respectively. The comparator 52 generates the RST signal mentioned above on line 56 when the binary count and predetermined count are equal. As will be described later herein, the RST signal resets both the circuit controller 46 and the binary counter 48 to zero.

Figure 5A:
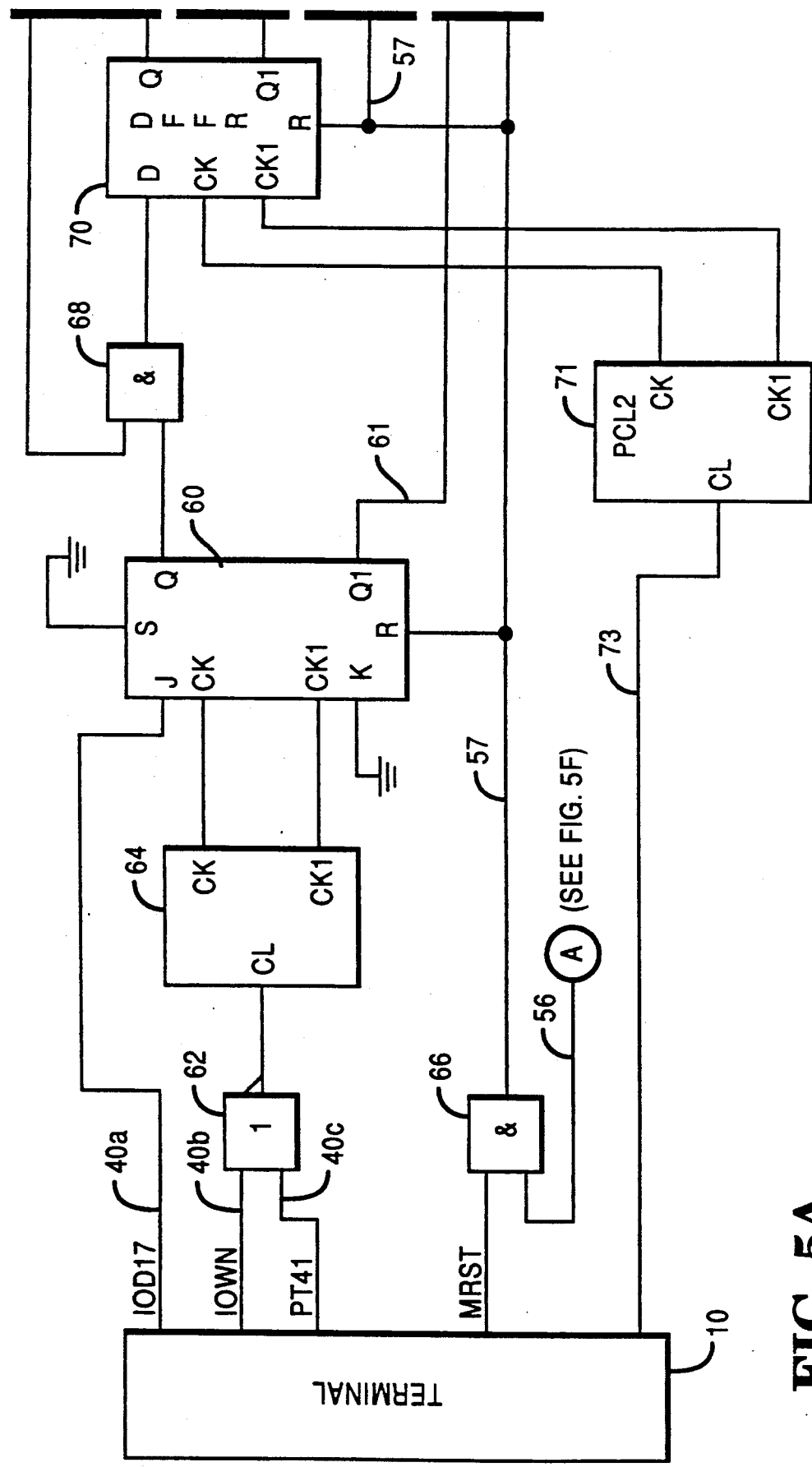
FIGS. 5A-5F taken together show a detailed schematic of the timeout circuit used in a preferred embodiment of this invention.

FIGS. 5A-5F are detailed schematics of the timeout circuit 36, including circuit controller 46, binary counter 48, and comparator 52. Referring to FIG. 5A, IOD17 signal is generated by microprocessor 12 in terminal 10 and is transmitted over line 40a and received by J input of JK flip flop 60. A NOR gate 62 has first and second inputs and they receive the IOWN and PT41 signals, respectively, from microprocessor 12 in terminal 10 over lines 40b and 40c. The output of NOR gate 62 is conventionally connected to the CL input of a two-phase clock generator 64 which outputs CK and CK1 signals which are inputted into the CK and CK1 terminals, respectively, of JK flip flop 60. The K input of JK flip flop 60 is connected to ground. A first input of AND gate 66 receives a MRST signal which is a master reset signal generated by microprocessor 12 in terminal 10 when terminal 10 is first turned on. A second input of AND gate 66 receives a RST signal from comparator 52 (FIG. 4) in microprocessor 12. The output of AND gate 66 is connected by line 57 to a reset input of JK flip flop 60 and the reset inputs of the other D-type flip flops, as shown in FIGS. 5A-5E. The Q output of JK flip flop 60 is connected to a first input of AND gate 68. The Q1 output of JK flip flop 60 is connected to driver 20 by line 61.

The binary counter 48 (FIGS. 5A-5E) includes seventeen conventional D-type flip flops, 72, 74, 76, 77a-77h, 78, 80, 84, 90, and 98. The binary counter 48 also includes AND gate 68 which, as mentioned above, has a first input connected to Q output of JK flip flop 60. The second input of AND gate 68 is connected to Q1 output of D-type flip flop 70 and to CK1 input of D-type flip flop 72. The output of AND gate 68 is connected to the D input of D-type flip flop 70. The CK and CK1 inputs of D-type flip flop 70 are connected to two phase clock generator 71 and each receives a 576 kilohertz signal therefrom when clock generator 71 receives a master clock signal from terminal 10 via line 73. It is to be noted that reset terminals of all of the D-type flip flops are connected to the output of AND gate 66. The Q and Q1 outputs of D-type flip flop 70 are connected to CK and CK1 inputs, respectively, of D-type flip flop 72

Figure 5B:
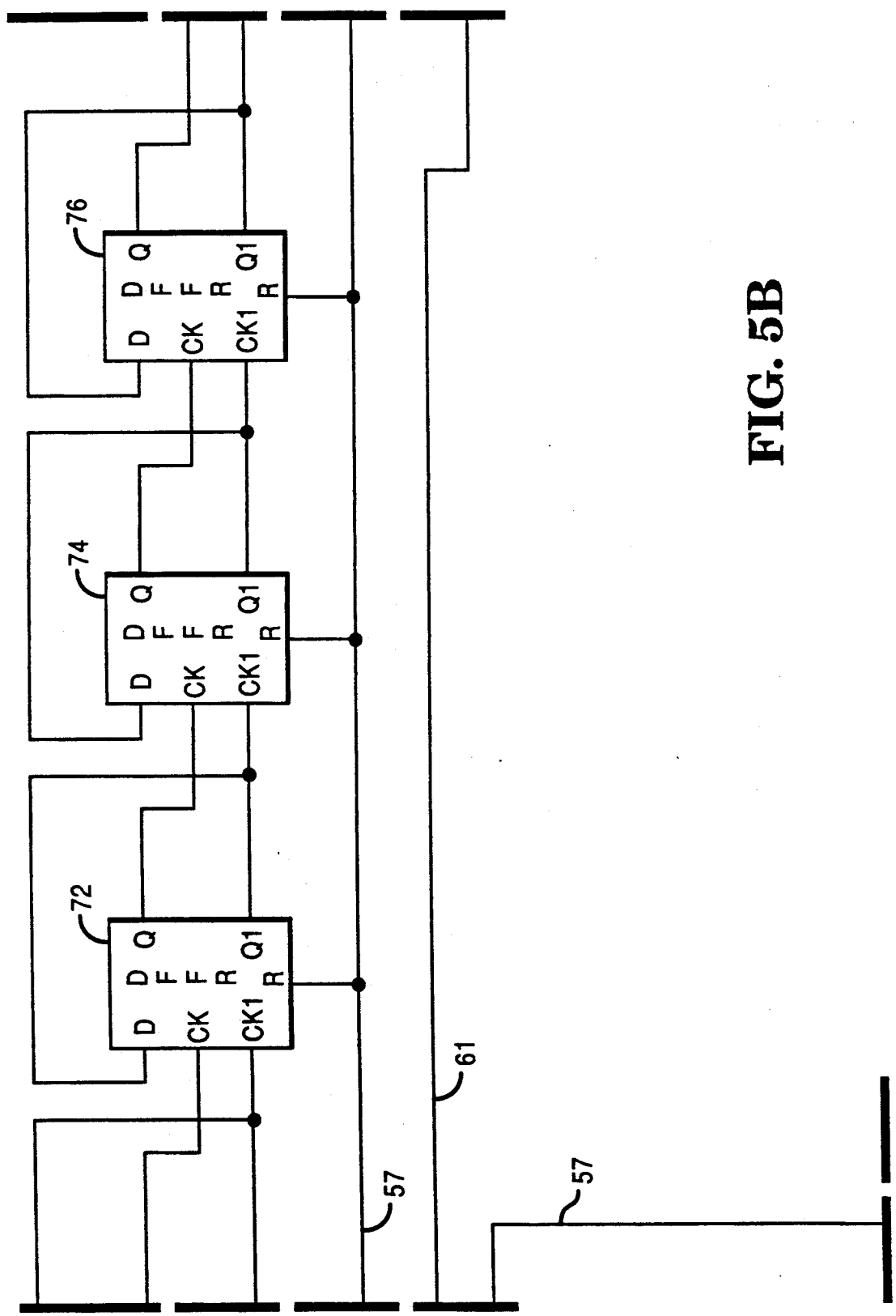
Figure 5C:
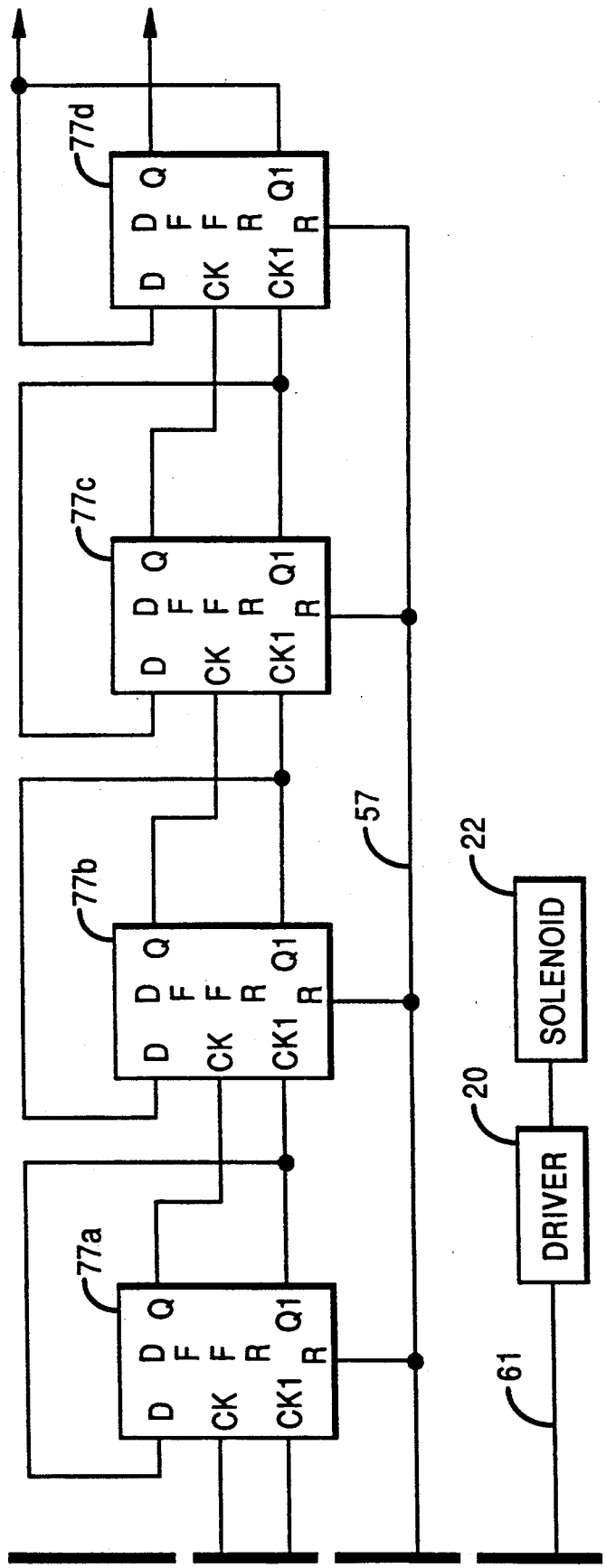
Figure 5D:
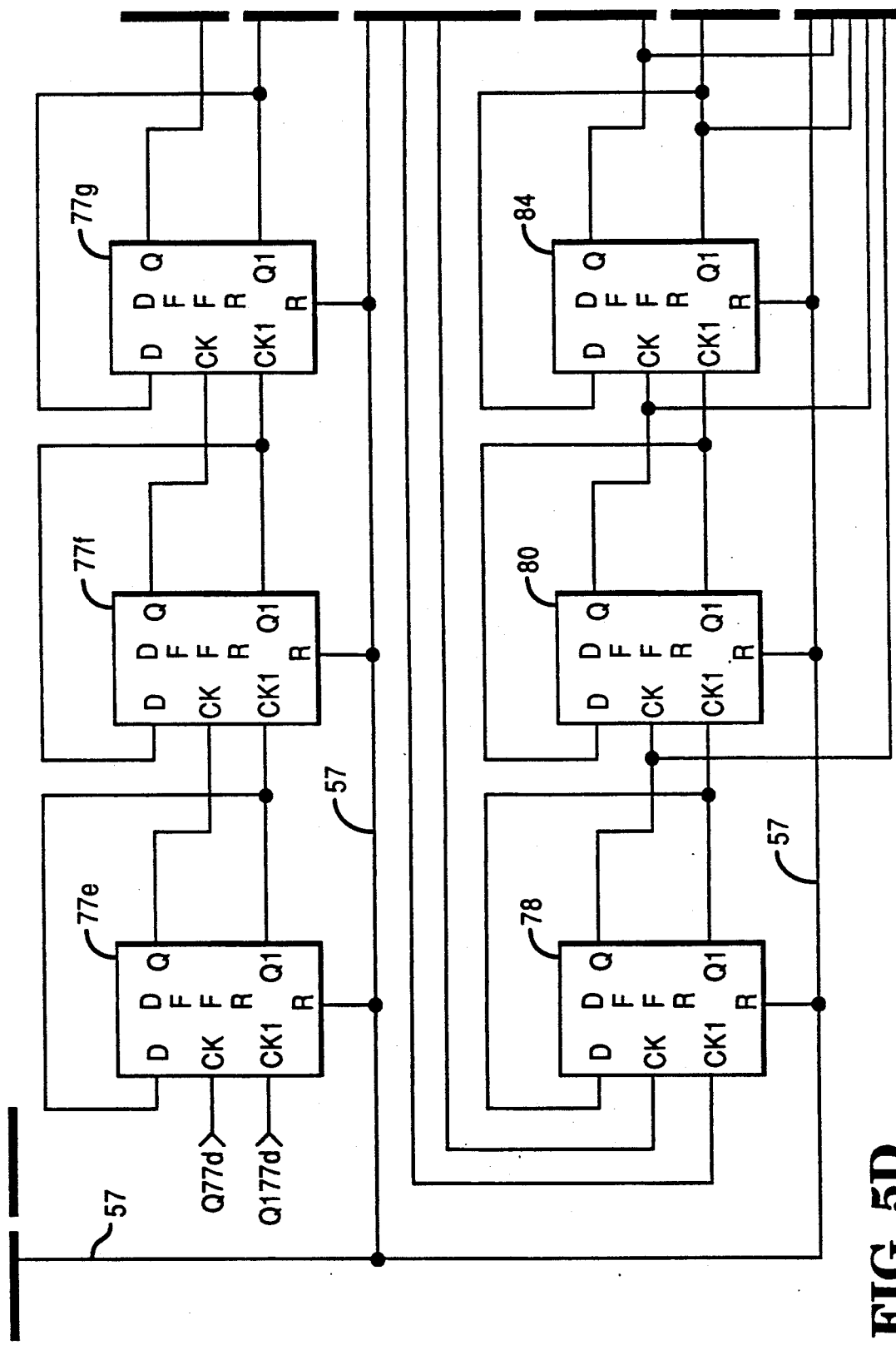
Figure 5E:
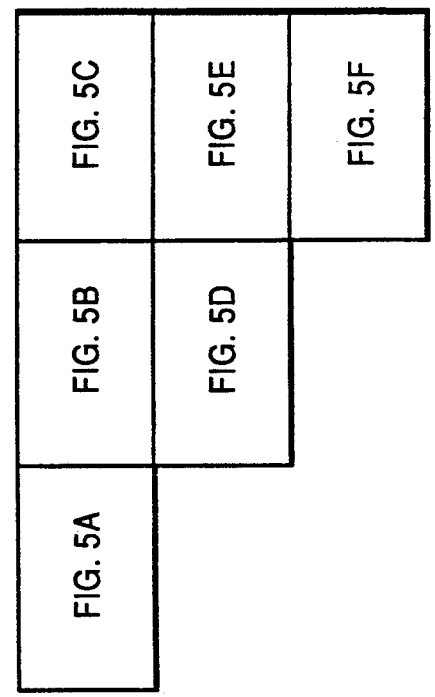
Figure 6:
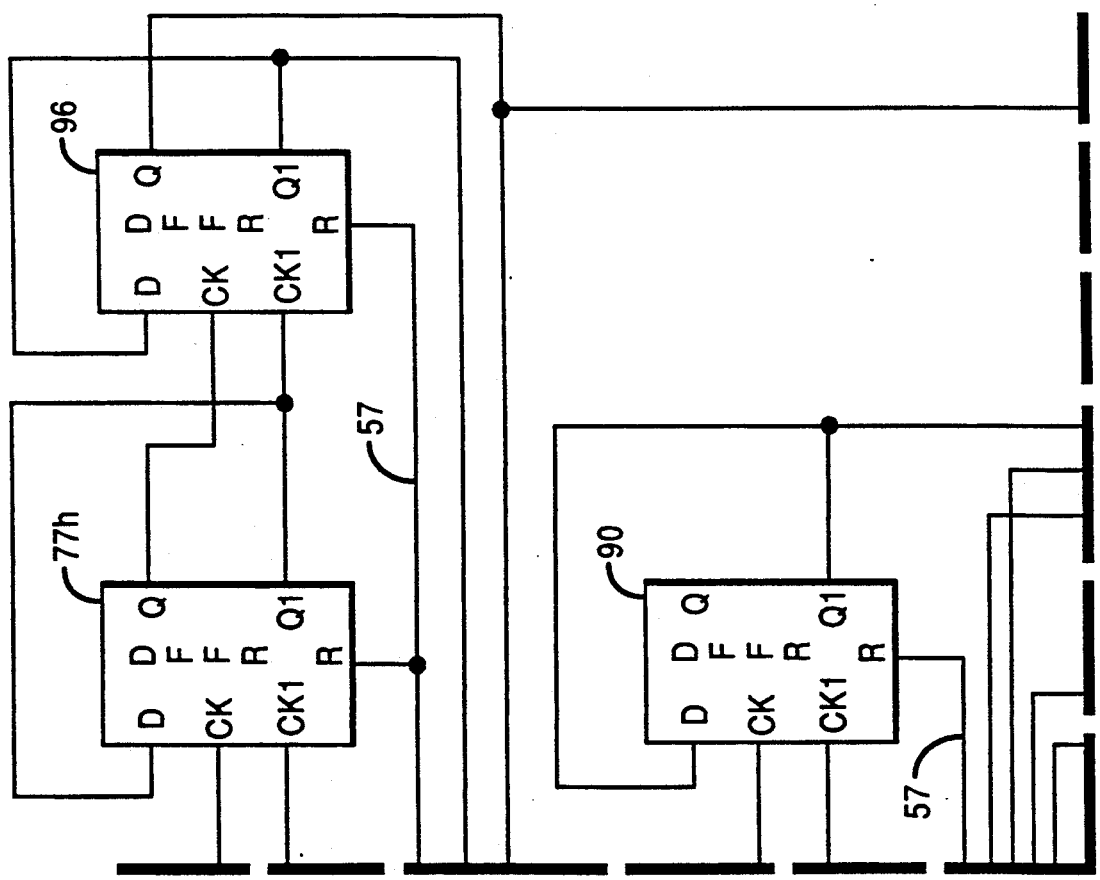

(Fig. 5B). The D input of D-type flip flop 72 is connected to its own Q1 output and to CK1 input of D-type flip flop 74. The Q and Q1 outputs of D-type flip flop 72 are connected to CK and CK1 inputs, respectively, of D-type flip flop 76. The remaining D-type flip flops are similarly connected, as shown in FIGS. 5B to 5E.

Figure 5F:
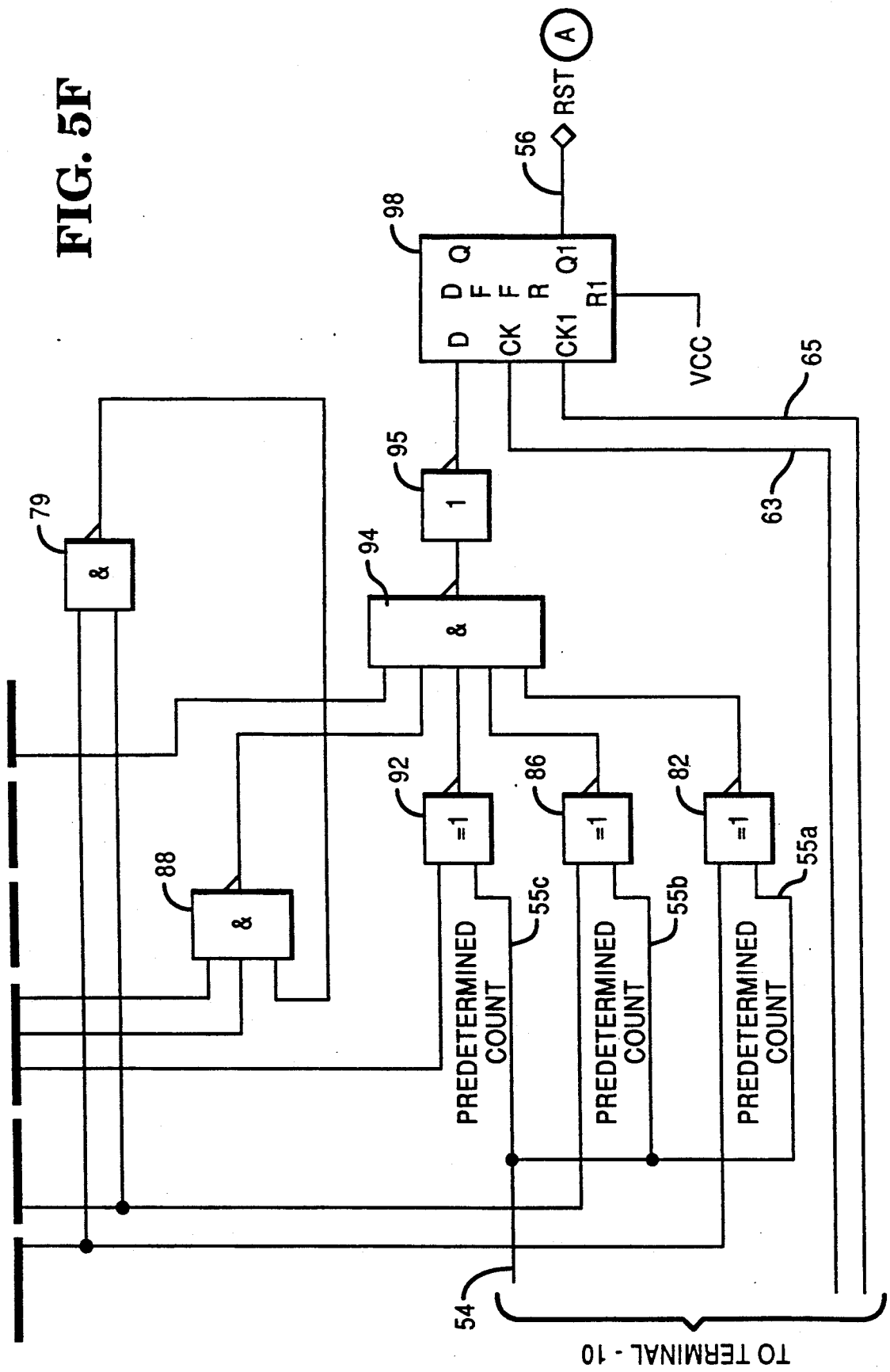

The comparator 52 (FIG. 5F) is comprised of a plurality of logic gates for providing a comparator function. The first input of NAND gate 79 is connected to the Q output of D-type flip flop 78 (FIG. 5D) and to CK input of D-type flip flop 80. The first input of NAND gate 79 is also connected to the first input of EXNOR gate 82, as best shown in FIG. 5F. The second input of NAND gate 79 is connected to Q output of D-type flip flop 80 and to CK input of D-type flip flop 84. The second input of NAND gate 79 is also connected to the first input of EXNOR gate 86. The output of NAND gate 79 is connected to a first input of NAND gate 88. The second input of NAND gate 88 is connected to Q output of D-type flip flop 84 and to CK1 input of D-type flip flop 90. The third input of NAND gate 88 is connected to D input and Q1 output of D-type flip flop 90. It is to be noted that the Q output of D-type flip flop 90 is not connected to any other component in timeout circuit 36. The first input of EXNOR gate 92 is coupled to Q output of D-type flip flop 84 and CK input of D-type flip flop 90 as shown. The second input of EXNOR gate 82, EXNOR gate 86, and EXNOR gate 92 are each coupled to microprocessor 12 in terminal 10 by lines 55a, 55b, and 55c. The second inputs receive the programmable predetermined count on lines 55a, 55b, and 55c, respectively, from, for example, a storage register (not shown) in terminal 10.

In a preferred embodiment, the predetermined count on lines 55a, 55b, and 55c are binary 0, 1, and 0, respectively, which will generate a timeout period, as described hereinafter. The outputs from EXNOR gate 82, EXNOR gate 86, EXNOR gate 92, and NAND gate 88 are coupled to first, second, third, and fourth inputs, respectively, of NAND gate 94. The fifth input of NAND gate 94 is coupled to Q output of D-type flip flop 96 and also to CK input of D-type flip flop 78 as shown. The inverter 95 is connected between an output of NAND gate 94 and D input on D-type flip flop 98. The function of inverter 95 is to invert the output of NAND gate 94. The CK and CK1 inputs of D-type flip flop 98 are connected by lines 63 and 65, respectively, to terminal 10, and they receive suitable clock signals therefrom. The reset input on D-type flip flop 98 is connected to a suitable power source, such as 5 volts, in terminal 10. The Q output of D-type flip flop 98 is not connected, but the Q1 output transmits the RST signal on line 56 to the second input of AND gate 66.

The method of operation of the invention will now be described. As mentioned above, this invention provides a method for energizing the solenoid 22 for a predetermined time period in a terminal 10, thereby causing the cash drawer 26 in terminal 10 to open.

Figure 7A:
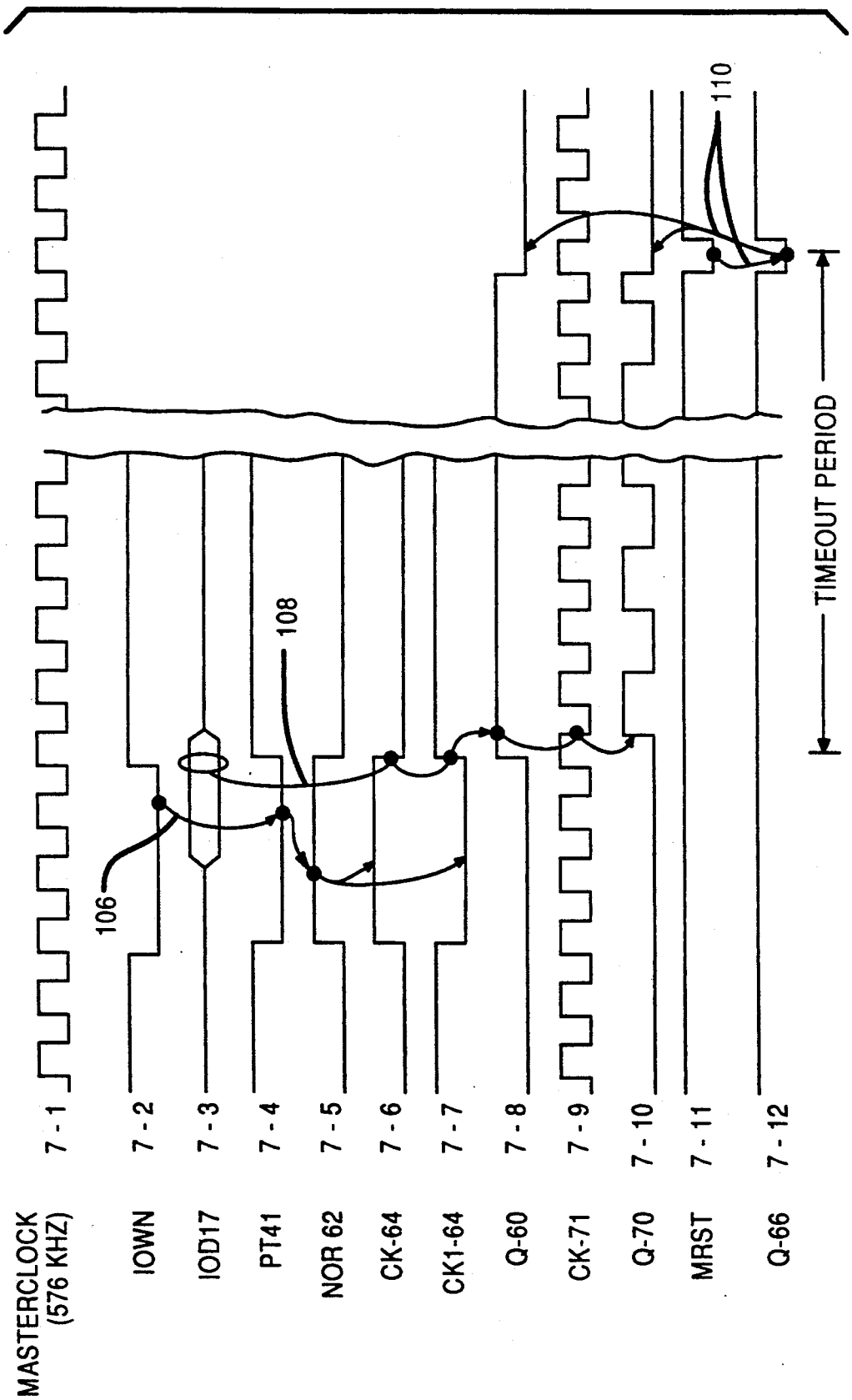
FIGS. 7A, 7B, and 7C taken together are waveforms of some of the components in the timeout circuit.
Figure 7B:
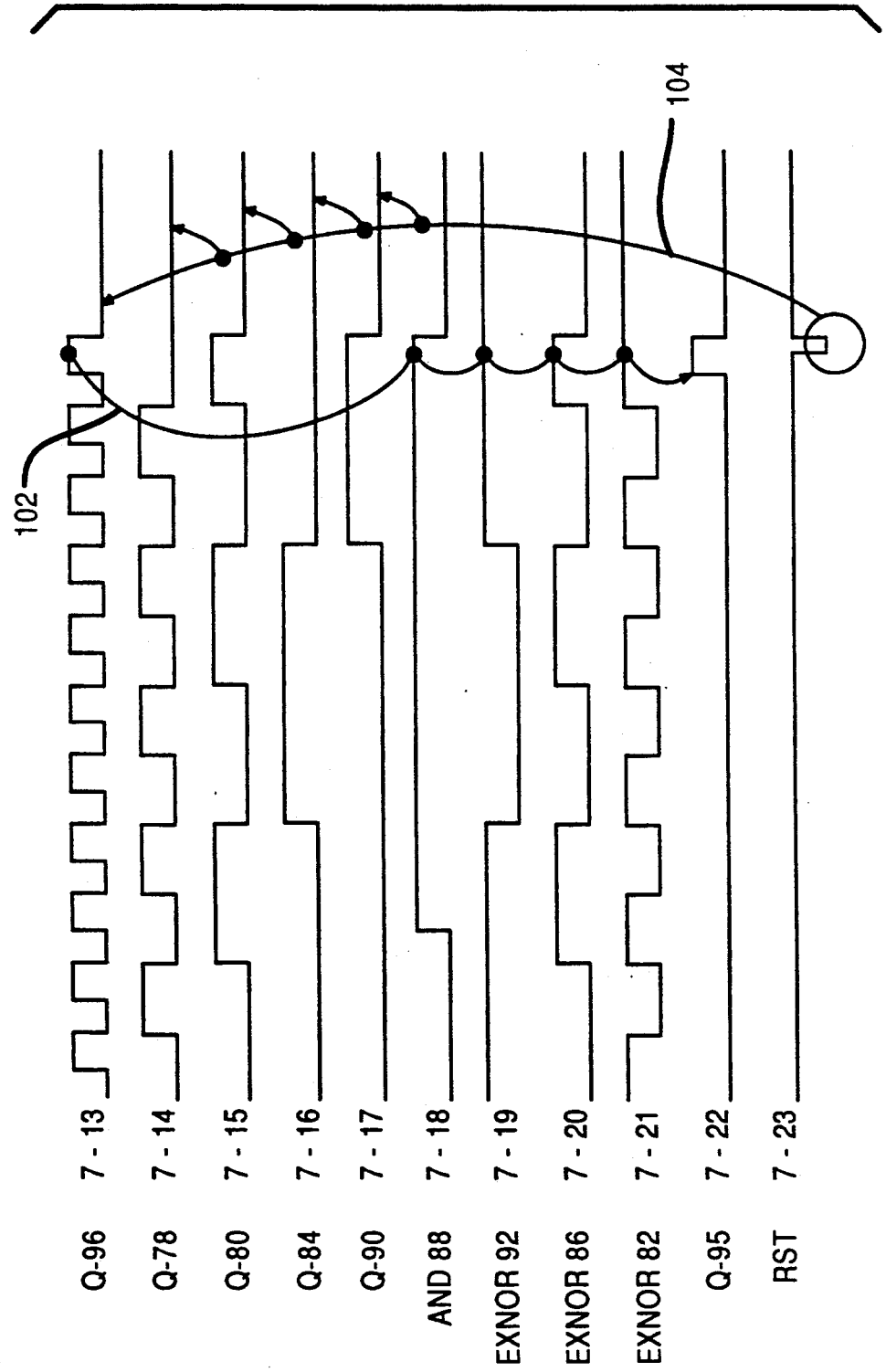
Figure 7C:
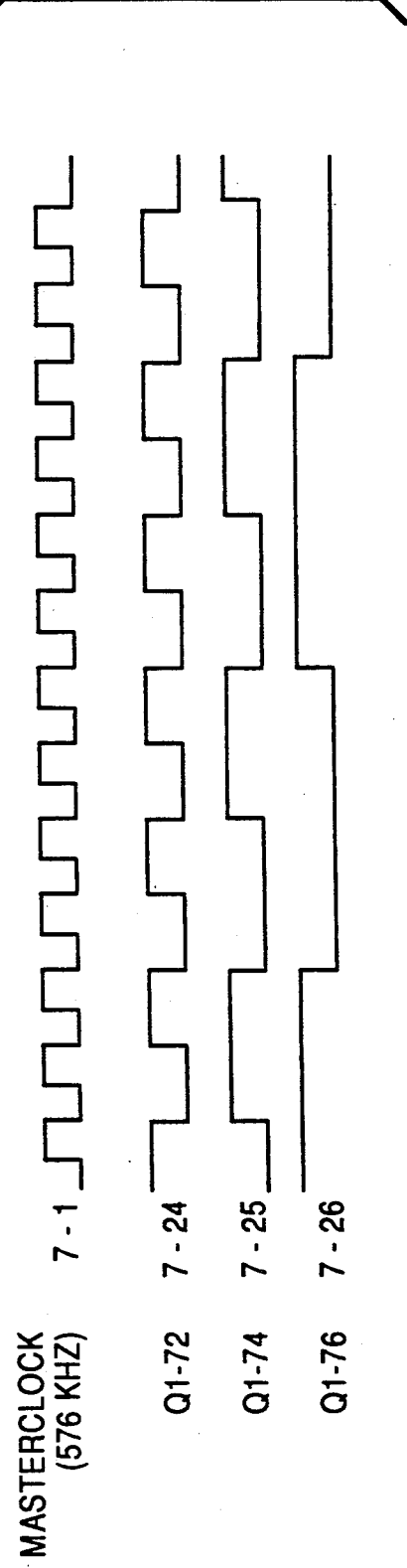

FIG. 7A, 7B, and 7C show the timing waveforms for a number of the components in timeout circuit 36. The terminal 10 generates the IOWN and PT41 (waveforms 7-2 and 7-4, respectively, in FIG. 7A) signals as the first and second inputs, respectively, of NOR gate 62. In a preferred embodiment, when the IOWN signal toggles from high to low to high, for example, the output of NOR gate 62 toggles from low to high and back to low, respectively, as best shown by line 106 and waveforms 7-2, 7-4, and 7-5 in FIG. 7A. This causes clock generator 64 to generate two phase clocks CK and CK1 signals (see line 106 and waveforms 7-6 and 7-7 in FIG. 7A) for the JK flip flop 60 which will trigger on if the IOD17 signal on the J input of JK flip flop 60 is high, as shown by waveform 7-3 in FIG. 7A. This enables the binary counter 48 to begin counting. Thus, the JK flip flop 60 acts as a master controller which generates an energizing signal through the Q1 output of JK flip flop 60. The JK flip flop 60 energizes driver 20 until it is reset.

As illustrated in the waveforms in FIGS. 7A, 7B, and 7C, on the first trailing edge, the J input of JK flip flop 7C becomes high, thereby causing the Q output (waveform 7-8) to be high. The high signal of the Q output and the Q1 output of D-type flip flop 70 are inputted to AND gate 68. This causes the D input and Q1 output of D-type flip flop 70 to be high. When the high signal from AND gate 68 and the clock signal (waveform 7-9) are inputted to the D-type flip flop 70, the Q1 output on D-type flip flop 70 (waveform 7-10) becomes low. Thus, the Q output of the D-type flip flop 70 will toggle from low to high on the first clock signal after reset, as can be seen from line 108 and waveforms 7-2, 7-6, 7-7, 7-8, 7-9, and 7-10 in FIG. 7A. As best shown by waveforms 7-1, 7-24, 7-25 and 7-26 in FIG. 7C, each D-type flip flop performs a divide-by-two function, thereby providing the ability to divide the 576 kilohertz master clock signal by a factor of $2^{17}$. In a preferred embodiment, this arrangement of D-type flip flops generates a predetermined energizing period range of 7.11 millisecond to 227.5 milliseconds. The binary count described above is comprised of the last five most significant bits which are generated by D-type flip flops 96, 78, 80, 84, and 90.

As mentioned previously, the comparator 52 (FIG. 4) compares the binary count to the predetermined count, and when they are equal comparator 52 generates the RST signal. As best shown in FIG. 5F, the comparator 52 includes the D-type flip flop 98 which has an output Q1 (shown in FIG. 7B as waveform 7-23) which constitutes the RST signal. The RST signal (waveform 7-23) is generated when NAND gate 94 generates a low signal on its Q1 output which is inverted to a high signal by inverter 95 (waveform 7-22) before being inputted into the D terminal of flip flop 98. The RST signal constitutes an input into AND gate 66 (see connecting symbol A and FIG. 5A). As mentioned previously, the other input into AND gate 66 is the MRST signal (waveform 7-11) which is generated by the microprocessor 12 when the terminal 10 is first turned on. The NAND gate 94 will generate a low signal when all of its inputs of EXNOR gates 82, 86 (FIG. 5F), and 96 (FIG. 5E) are at the same level, as shown by line 102 and waveforms 7-13, 7-18, 7-19, 7-20, 7-21, and 7-22 in FIG. 7B. Thus, when the input of EXNOR gate 82 is at the same level as the predetermined count on line 55a, then EXNOR gate 82 will generate a high signal. The EXNOR gates 86 and 92 generate a high signal in the same manner. The predetermined count on lines 55a, 55b, and 55c can be programmed by actuating the appropriate key 15 on keyboard 14 which causes the microprocessor controller 11 to store a binary 1 or 0 in either ROM 28 or RAM 30 for lines 55a, 55b, and 55c. By selectively programming the predetermined count on lines 55a, 55b, and 55c, the timeout period for generating the energizing signal to energize driver 20 can be controlled. The other two inputs of NAND gate 94 are comprised of the output of NAND gate 88 and the Q output of D-type flip flop 96. When their outputs are high and the outputs of EXNOR gates 82, 86, and 92 are high, then the output of NAND gate 94 will be a low signal which is inverted by inverter 95 and inputted to terminal D of D-type flip flop 98, thereby causing D-type flip flop 98 to generate the RST signal on its Q1 output. As mentioned previously, when AND gate 66 receives the RST signal and a comparable MRST signal (waveform 7-11), the AND gate 66 will reset the JK flip flop 60 and all of the binary counters of binary counter 48 to a low (as best shown by line 110 and waveforms 7-11, 7-8, 7-10, and 7-12 in FIG. 7A; and line 104 and waveforms 7-23, 7-13, 7-14, 7-15, 7-16, and 7-17 in FIG. 7B).

The other waveforms in FIGS. 7A-7C show some of the timing patterns of the components in the timeout circuit 36. As mentioned previously herein, the function of timeout circuit 36 is to energize a driver 20, which energizes solenoid 22, for a predetermined energizing period. The timeout period is illustrated in FIG. 7A as the time beginning when the Q output of JK flip flop 60 goes high and continues until the RST signal (waveform 7-23 goes Q output of AND gate 66 (waveform 7-12) goes low. Thus, when it is desirable to open the cash drawer 26, the appropriate key 15 on keyboard 14 is actuated. This causes microprocessor 12 to generate the appropriate input signals to energize timeout circuit 36 to generate an energizing signal for the predetermined energizing period. The energizing signal is then received by the driver 20 which energizes solenoid 22 for the predetermined energizing period, thereby causing the cash drawer 26 to open.

It is to be noted that the preferred embodiment is made using Application Specific Integrated Circuit (ASIC) technology. The microprocessor 12, timeout circuit 36, and driver 20 are each manufactured as a chip which is mounted on a circuit board.

Figure 8:
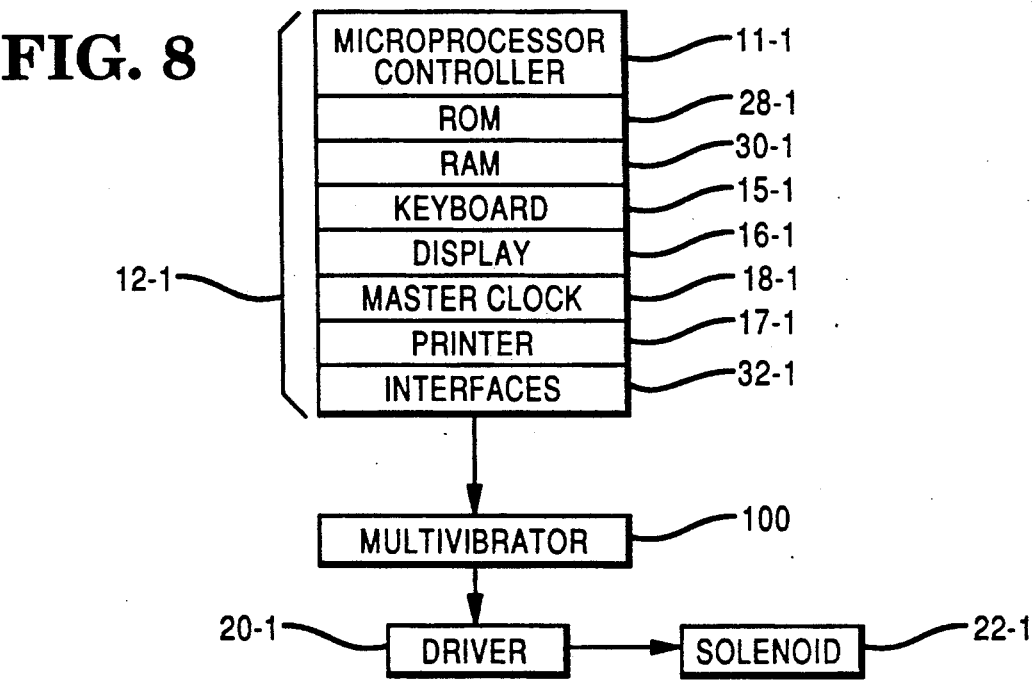
FIG. 8 is a general block diagram of a second embodiment of this invention.

FIG. 8 shows a second embodiment of this invention wherein a multivibrator 100 may be used to energize a driver 20-1. A suitable multivibrator is model CD54/74HC221 or model CD54/74HCT221, manufactured by RCA Corporation of Piscataway, N.J. Notice that the microprocessor 12-1, microprocessor controller 11-1, ROM 28-1, RAM 30-1, keyboard 15-1, display 16-1, master clock 18-1, printer 12-1, interfaces 32-1, driver 20-1, and solenoid 22-1 are connected and operate in the same manner as in the previously described embodiment. It is to be noted that the timeout circuit 36 in the previously described embodiment provides flexibility and versatility over this second embodiment because the predetermined count in the previously described embodiment can be programmed.

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

What is claimed is:

1. An electronic business machine having a cash drawer therein, said electronic business machine comprising:
    a master controller including software for controlling the operation of the electronic business machine;
    a keyboard coupled to said master controller, said keyboard having at least one key thereon;
    first means controlled by said master controller for generating a first signal in response to said sat least one key being actuated;
    opening means for opening the cash drawer; and
    a timeout circuit operatively coupling said first means and said opening means; said timeout circuit being capable of generating a second signal in response to said first signal;
    said software in said master controller initiating said first means to generate said first signal and said timeout circuit generating the second signal for a predetermined energizing period in response to said first signal when said at lest one key is actuated, said opening means becoming energized for said predetermined energizing period and causing the cash drawer to open in response to said second signal; said timeout circuit preventing said opening means from being energized beyond a predetermined energizing period.

2. The electronic business machine as claimed in claim 1 in which said timeout circuit is a multivibrator.

3. The electronic business machine as claimed in claim 1 in which said electronic business machine further comprises:
    a master clock for generating a master clock signal;
    said timeout circuit further comprising:
        a circuit controller for receiving said first signal and also for generating the second signal during said predetermined energizing period in response to said first signal;
        a binary counter coupled to said master clock for generating a binary count representing the cumulative count of pulses of said master clock signal received by said binary counter during said predetermined energizing period;
        a comparator coupling said circuit controller and said binary counter for receiving the predetermined count and said binary count and also for generating a reset signal when said binary count and said predetermined count are equal;
        said predetermined energizing period corresponding to the time period beginning when said circuit controller receives said first signal and ending when said circuit controller receives said reset signal.

4. The electronic business machine as claimed in claim 1 in which said opening means includes a solenoid which is operatively coupled to said cash drawer.

5. The electronic business machine as claimed in claim 1 in which said opening means further includes a driver for energizing said solenoid.

6. The electronic business machine as claimed in claim 1 in which said electronic business machine is a point of sale terminal.

7. The electronic business machine as claimed in claim 1 in which said electronic business machine generates a master reset signal when said electronic business machine is turned on; said master reset signal preventing said circuit controller and said binary counter from generating said second signal and said cumulate count, respectively.

8. A point of sale terminal having a cash drawer and a keyboard with a plurality of keys thereon, said point of said terminal comprising:
    opening means for opening said cash drawer;
    energizing means for outputting a first signal in response to key on the keyboard being actuated;
    a timeout circuit coupled to said energizing means and said opening means for receiving said first signal and for outputting a second signal for a predetermined period in response thereto; and said timeout circuit comprising:
- a controller for outputting said second signal in response to said first signal and also for receiving a reset signal;
- master clock means coupled to said binary counter and said comparator for outputting a master clock signal;
- a binary counter coupled to said controller for outputting as cumulative count corresponding to the frequency of said master clock signal received by said binary counter after said binary counter receives said second signal; and
- a comparator coupled to said controller and said binary counter for comparing said cumulative count to a preselected count; said comparator outputting said reset signal when said cumulative count and said preselected count are equal;

said energizing means generating said first signal in response to a key on said keyboard being actuated and causing said timeout circuit to output said second signal for said predetermined period in response to said first signal, said opening means thereafter receiving said second signal and opening the cash drawer in response thereto; said timeout circuit preventing said opening means from being energized beyond a predetermined energizing period.

9. The point of sale terminal as claimed in claim 8 in which said point of sale terminal generates a master reset signal for preventing said circuit controller and said binary counter from outputting said second signal and said cumulative count, respectively.

10. The point of sale terminal as claimed in claim 9 in which said opening means further includes a driver coupled to said solenoid and said timeout circuit.

11. The point of sale terminal as claimed in claim 8 in which said energizing means includes a master controller coupled to said keyboard for controlling the point of sale terminal.

12. The point of sale terminal as claimed in claim 8 in which said opening means further includes a solenoid.

13. A method for energizing a device in a point of sale terminal for a predetermined energizing period, said device being capable of opening a cash drawer in the terminal when the device is energized, said point of sale terminal further having a master controller and a circuit controller for generating a first signal and a second signal, respectively, said method comprising the steps of:

(I) generating a first signal with said master controller;
(II) generating a second signal with said circuit controller in response to said first signal;
(III) controlling the duration of said second signal;
(IV) using said second signal to energize the device for the predetermined energizing period; and
(V) using the device to open the cash drawer;

said step (III) further including the steps of:
- (III)(a) providing a master clock signal;
- (III)(b) generating a cumulative count of pulses of said master clock signal in response to said first signal;
- (III)(c) comparing said cumulative count to a predetermined count corresponding to the duration of the predetermined energizing period; and
- (III)(d) terminating said second signal generated in said step (II) when said cumulative count and said predetermined count are equal.

14. The method as recited in claim 13 in which said master controller is coupled to a keyboard having at least one key thereon, in which said step (I) further includes the step of:
(I)(a) effecting said step (I) by actuating said at least one key.

15. The method as recited in claim 13 in which said step (III)(b) is effected by a binary counter.

16. The method as recited in claim 15 in which said step (III)(b) further includes the step of:
(III)(b)(1) resetting said binary counter when said binary counter receives said reset signal.

17. The method as recited in claim 13 in which said step (III)(d) further includes the steps of:
(III)(d)(1) generating a reset signal when said cumulative count and said predetermined count are equal; and
(III)(d)(2) terminating said second signal when said circuit controller receives said reset signal.

18. The method as recited in claim 13 in which said method further includes the step of:
(VI) generating a master reset signal when the point of ale terminal is turned on for presenting the predetermine energizing period.

19. The method as recited in claim 13 in which said device comprises a solenoid and said step (IV) further includes the steps of:
(IV)(a) coupling a driver to said solenoid; and
(IV)(b) energizing said driver with said second signal.

* * * * *

UNITED STATES PATENT AND TRADEMARK OFFICE
CERTIFICATE OF CORRECTION

PATENT NO. : 5,111,394
DATED : May 5, 1992
INVENTOR(S) : Hilles et al.

It is certified that error appears in the above-identified patent and that said Letters Patent is hereby corrected as shown below:

Column 7, line 66, "of" should be --for--.

Column 7, line 67, "sat" should be --at--.

Column 8, line 57, "cumulate" should be --cumulative--.

Signed and Sealed this

Thirty-first Day of August, 1993

Attest:

BRUCE LEHMAN

Attesting Officer

Commissioner of Patents and Trademarks